(12) United States Patent
Zedlitz et al.

(10) Patent No.: US 8,090,752 B2
(45) Date of Patent: Jan. 3, 2012

(54) MONITORING MEMORY CONSUMPTION

(75) Inventors: Albert Zedlitz, Wiesloch (DE); Jean Baptiste Doudia, Mannheim (DE)

(73) Assignee: SAP AG, Walldorf (DE)

( * ) Notice: Subject to any disclaimer, the term of this patent is extended or adjusted under 35 U.S.C. 154(b) by 440 days.

(21) Appl. No.: 12/336,221

(22) Filed: Dec. 16, 2008

(65) Prior Publication Data

US 2010/0153475 A1    Jun. 17, 2010

(51) Int. Cl.
*G06F 12/16* (2006.01)
*G06F 17/30* (2006.01)

(52) U.S. Cl. .................................. 707/814; 707/819
(58) Field of Classification Search .................. 707/813, 707/819, 999.206, 206, 814
See application file for complete search history.

(56) References Cited

U.S. PATENT DOCUMENTS

| | | | |
|---|---|---|---|
| 6,502,109 B1 * | 12/2002 | Aravamudan et al. ............... | 1/1 |
| 6,711,606 B1 * | 3/2004 | Leymann et al. .............. | 709/203 |
| 6,763,440 B1 * | 7/2004 | Traversat et al. ............. | 711/159 |
| 6,915,307 B1 * | 7/2005 | Mattis et al. ........................... | 1/1 |
| 7,509,360 B2 * | 3/2009 | Wollrath et al. ........................ | 1/1 |
| 7,757,214 B1 * | 7/2010 | Palczak et al. ................. | 717/121 |
| 7,793,304 B2 * | 9/2010 | Schank et al. ................. | 719/320 |
| 2003/0093505 A1 * | 5/2003 | Waldo et al. ................... | 709/220 |
| 2003/0188120 A1 * | 10/2003 | Maeda ........................... | 711/170 |
| 2005/0065753 A1 | 3/2005 | Bigus et al. | |
| 2006/0209695 A1 * | 9/2006 | Archer et al. ................. | 370/235 |
| 2006/0277440 A1 | 12/2006 | Minshall et al. | |
| 2007/0033365 A1 | 2/2007 | Vaidyanathan | |
| 2007/0143558 A1 * | 6/2007 | Tseytin .......................... | 711/170 |

FOREIGN PATENT DOCUMENTS
EP    1349077 A2    1/2003

OTHER PUBLICATIONS

"The Case for Application-Specific Benchmarking," by Seltzer et al, Proceeding of the Seventh Workshop on Hot Topics in Operating Systems, 1999.*
"Tracking Probabilistic Correlation of Monitoring Data for Fault Detection in Complex Systems," by Guo et al, Proceeding of the 2006 International Conference on Dependable systems and Networks, 2006.*
"Analysis of Performance Problems in SOA: Find the Right Track", [Online]. Retrieved from the Internet: <URL: http://www.ap-verlag.de/Online-Artikel/SOA/200609%20Opnet%20Performance%20in%20SOA.htm>, Translation Found at: <http://translate.google.com/translate?hl=en&sl=de&u=http://www.ap-verlag.de/Online-Artikel/SOA/200609%2520Opnet%2520Performance%2520in%2520SOA.htm>,(Nov. 19, 2008),5 pgs.
"European Application Serial No. 09007487.3, Extended European Search Report Mailed on Jan. 20, 2010", 8 pgs.
Barham, P., et al., "Using Magpie for request extraction and workload modeling", *6th Symposium on Operating Systems Design and Implementation*, (2004), pp. 259-272.
Chen, D., et al., "Gated memory control for memory monitoring, leak detection and garbage collection", Proceeding of the 2005 Workshop on Memory Systems Performance, XP002562305, (2005), 62-67.

* cited by examiner

*Primary Examiner* — James Trujillo
*Assistant Examiner* — Bruce Moser
(74) *Attorney, Agent, or Firm* — Schwegman, Lundberg & Woessner, P.A.

(57) ABSTRACT

Apparatus, systems, and methods are disclosed that operate to monitor the occurrence of memory garbage collection events and node content service requests, to determine a correlation between the node content service requests and the memory garbage collection events, and to report information associated with suspicious ones of the node content service requests. Suspicious requests may be identified as those that satisfy a preselected criteria associated with the correlation. Additional apparatus, systems, and methods are disclosed.

24 Claims, 6 Drawing Sheets

MONITORING MEMORY CONSUMPTION

BACKGROUND

An application server, such as a Java application server, is often tasked to handle a large number of service requests. Thus, server performance can decrease dramatically even when only a few of the requests result in consuming a relatively large amount of memory. For this reason, monitoring memory consumption in such systems can be useful with respect to maintaining overall system stability. However, when the system is highly utilized, the activity of monitoring memory can itself significantly impact system performance.

DETAILED DESCRIPTION

A "session" can be characterized as a series of interactions between communication end points that occur while a particular connection is active. To initiate a session, one node, such as a client, may request a connection with another node, such as a server. If the nodes agree, commands and data can be exchanged. This exchange forms part of the session. The session begins when the connection is established at both ends, and terminates when the connection is terminated. Further requests, to initiate additional sessions, are common.

To accommodate large numbers of service requests with a relatively minor impact on system performance, the mechanisms described herein can be used to implement memory consumption monitoring based on correlation analysis. For example, in many embodiments, a statistical evaluation of the correlation between garbage collection (GC) events and service request activity can be used to identify suspicious request activities that appear to lead to excessive memory use. Identifying and regulating such requests can lead to increased system operational stability. For example, in some embodiments, these mechanisms are used as part of administrative interfaces to monitor the memory consumption that occurs in Java application servers.

It should be noted that while use of Java applications and Java application servers have been described herein by way of example, the various embodiments described are not to be so limited. Any device having memory that can be used as a resource to accommodate requests for service within a data processing system, operated in conjunction with any programming language, can be monitored for excessive memory consumption as described herein.

For the purposes of this document, an "application" means a collection of instructions that can be executed by a processor. Such applications include browsers, word processors, spreadsheet processors, presentation processors, database processors, and drawing processors, and many others. Applications may be used to process electronic content.

"Electronic content" includes any digital data that may be presented to a user (e.g., visually or audibly presented), such as an electronic document, page-descriptive electronic content such as a page-descriptive electronic document, media stream, web page, hypertext document, image, digital video or video recording, digital audio or audio recording, an animation, a markup language document, such as for example a document including HyperText Markup Language (HTML) or XML, a form having components to be filled in, or data describing the application of a graphical user interface (GUI). Electronic content may comprise a variety of content elements.

A "content element" includes any part or share of electronic content that is defined or discernable as a part or share. For example, a content element may be automatically discerned from a characteristic of the content element itself (e.g., a paragraph of an electronic document, or a file format designation) or may be manually defined by a user (e.g., a user-selected collection of words in an electronic document, a user-selected portion of a digital image). Examples of content elements include portions of a page-descriptive document or other electronic document, such as, for example, pieces of electronic text or other material, such as a group of instructions within the electronic document, dynamic content in the form of portions of media streams such as sections of digital video or frames or sets of frames of digital video or digital audio, dynamic content in the form of segments or frames of animations, electronic forms, form templates, form elements, form data, actuatable element specifications or executable instructions, and various elements presentable or accessible by users within electronic content, including instances of scripted and non-scripted dynamic content and the like.

Certain applications or processes are described herein as including a number of modules. A "module" is a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" may include an identifiable portion of code, data, or computational object, such as a document application, designed to achieve a particular function, operation, processing, or procedure.

A "node" may comprise a server, a client, or any independent computing device that is capable of receiving service requests.

A "resource" comprises a web page, a file on a disk, or any manifestation of information inside a computer system. Other examples of resources include address book items, database entries, and calendar appointments, among others.

The various embodiments disclosed herein can operate to enable memory consumption monitoring with relatively little impact on the system being monitored. Some example embodiments that include this type of operation will now be described in more detail.

Figure 1:
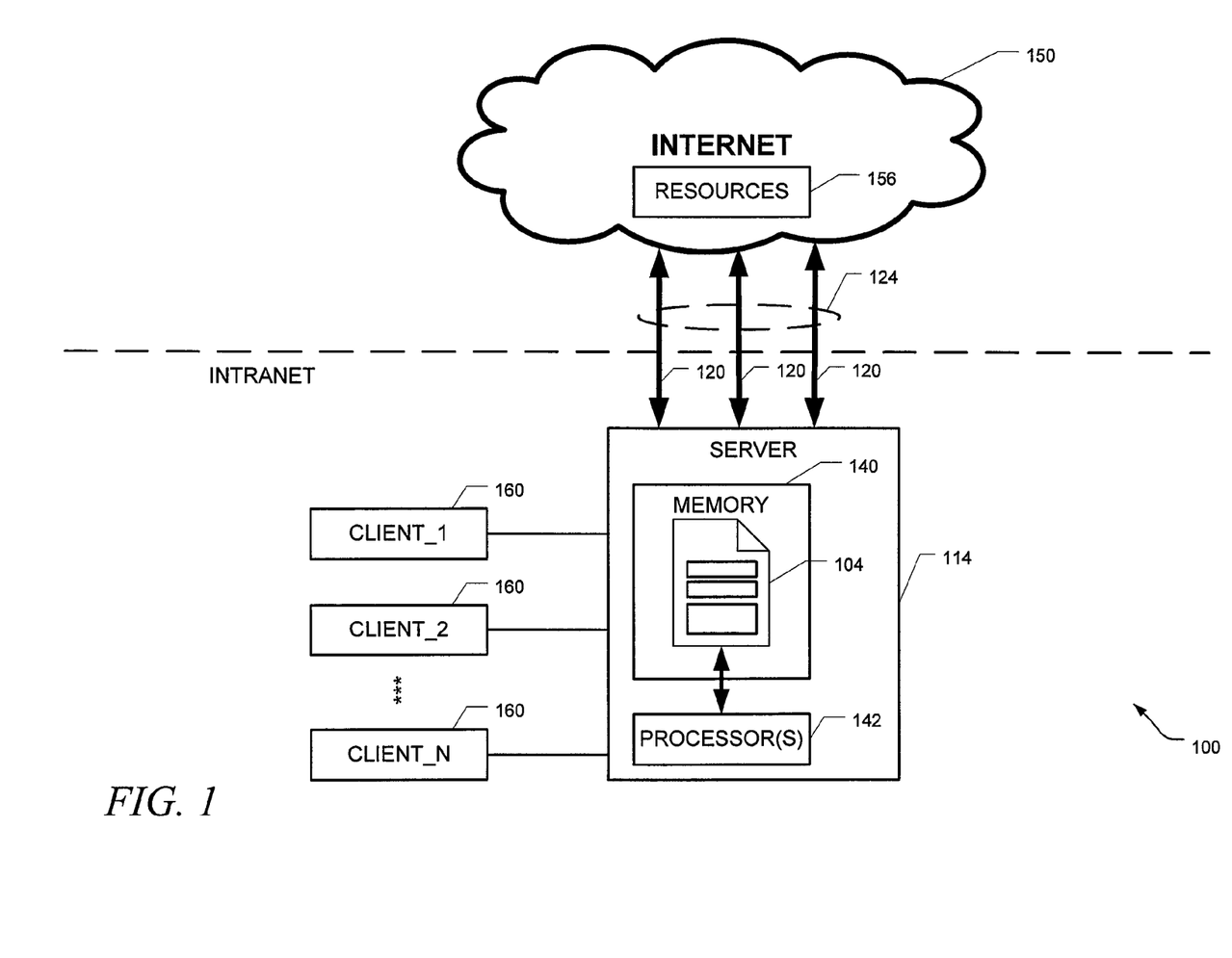
FIG. 1 illustrates a process of monitoring memory consumption, according to various embodiments of the invention.

FIG. 1 illustrates a process 100 of monitoring memory consumption, according to various embodiments of the invention. For example, consider a server 114 executing an application 104. The server 114 may be coupled to the Internet 150 using one or more networks 124. As a part of accessing a variety of resources 156, numerous uniform resource locator (URL) service requests 120 may be submitted over the network 124. Such requests may result from the use of a browser by a number of clients 160 that operate to continually access a particular web site, for example. Some of the service requests 120 may result in significant consumption of the memory 140 within the server 114.

In a Java Virtual Machine (JVM), the memory 140 used to store items such as variables is called the heap space. The heap space can be divided up into smaller spaces called generations. There are usually several generations within the heap, including the young generation space that contains: the Eden space, Survivor 0 space, and Survivor 1 space.

The specific generation an object falls into is dependent on its age. Newly born memory objects placed into memory are usually created in the Eden space first. When the Eden space is full, memory items that are still alive are moved to Survivor 0 space, and the Eden space is cleared of old objects that are no longer required by the JVM. This provides room for new incoming objects. When the Survivor 0 space fills up, the objects that are still alive in that space are moved to the Survivor 1 space, and the Survivor 0 space is cleaned out.

Space in the memory 140 is managed by the JVM, in part, through GC activity. The garbage collector moves things around in the memory heap space and determines whether certain items are kept or discarded. Without GC activity, the available memory 140 would be used up relatively quickly. Thus, after a number of service requests 120, such as URL requests, a GC event will occur to free up memory 140 that is no longer needed.

For the purposes of this disclosure, it can be assumed that the same service request results in more or less the same amount of memory consumption. This may or may not be true with respect to the first time a URL is accessed, for example, since there may be additional memory allocated due to class loading, cache filling, etc. However, the total amount of memory consumed during the first access operation may be discarded, or perhaps taken into account as part of a special procedure. Subsequent URL service requests should be more representative of an average consumption value.

For JVMs, and other processes that make use of GC routines, it can be assumed that the GC routines will be triggered once a defined area of memory (e.g., the Eden space), is exhausted. As a result, it can be expected that the server or other machine involved can handle a fixed number of service requests without experiencing a GC event. Thus, if a certain request (e.g., to access a specific URL) uses a lot of memory, the total number of requests between GC intervals will usually decrease. Therefore, a correlation analysis can be used to find the variance of intervals that include, and that do not include, this type of "suspicious" request.

Figure 2:
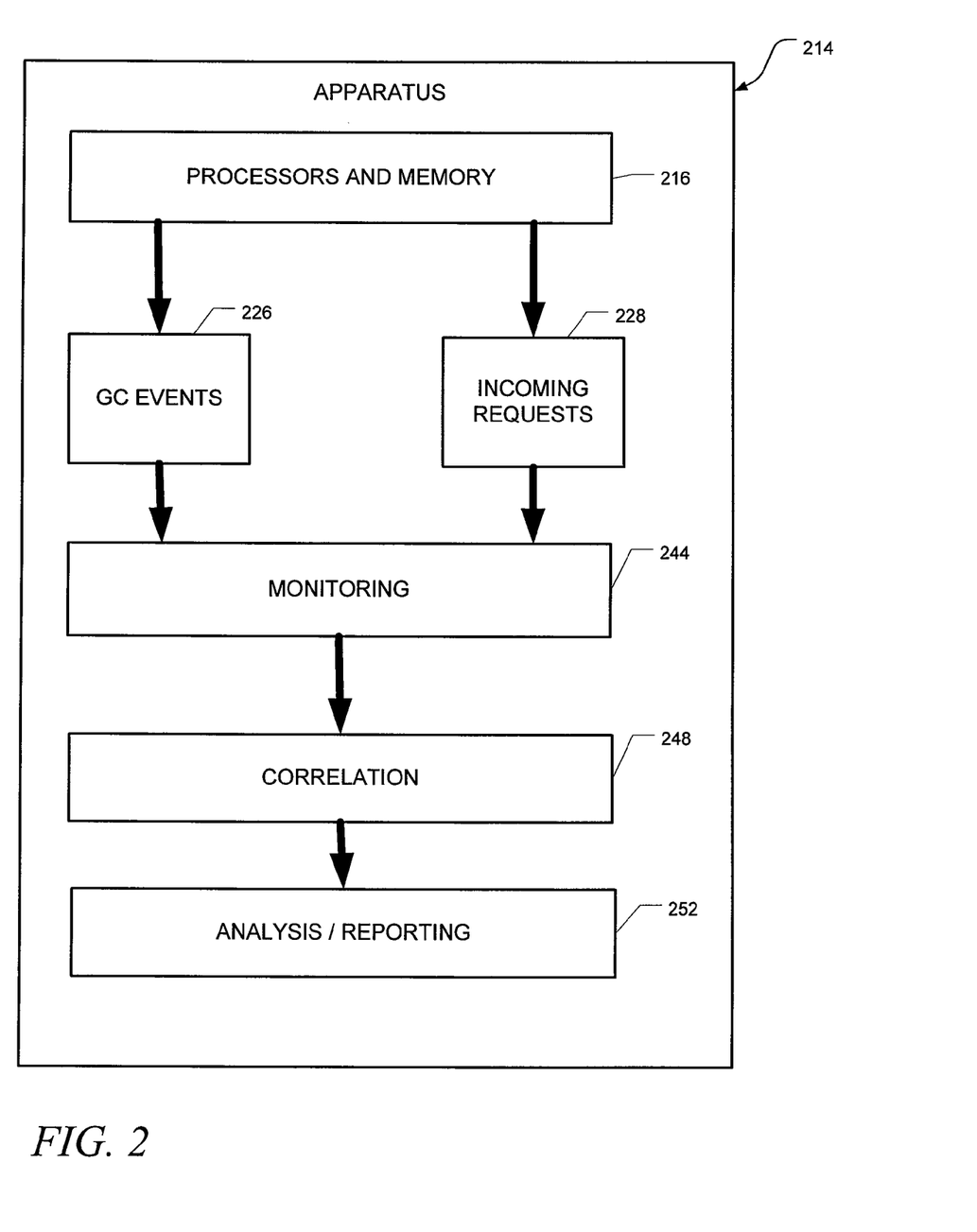
FIG. 2 is a block diagram of an apparatus for monitoring memory consumption, according to various embodiments of the invention.

FIG. 2 is a block diagram of an apparatus 214 for monitoring memory consumption, according to various embodiments of the invention. The apparatus 214 may comprise a node, perhaps similar to or identical to the server 114 of FIG. 1. Turning now to FIG. 2, it can be seen that the apparatus 214 comprises hardware that provides data as input into several modules. The hardware in this case comprises processors and memory 216, and the data includes GC events 226 and incoming service requests 228 (e.g., requests for URL access). The modules include a monitoring module 244, a correlation module 248, and an analysis/reporting module 252.

The GC events 226 and incoming requests 228 can be provided as a result of activity on the part of the processors and memory 216. As incoming requests 228 occur, and as memory is allocated in response, GC events 226 will also occur. As the requests 228 and events 226 take place, information related to their appearance can be archived with very little performance impact.

To identify suspicious requests for further analysis, attention can be focused on those time intervals between GC events 226 where fewer service requests occur. This is because those situations are characteristic of memory consumption activity. Thus, individual service requests can be evaluated over some selected number of intervals INT defined by the periodic occurrence of GC events 226.

In some embodiments, monitoring memory consumption may include processing the GC events 226 and incoming requests 228 by:

1. Using the monitoring module 244 to archive the events 226 and requests 228, and perhaps to calculate the average number of requests X of a given type that occur in a selected number of intervals INT between GC events containing the given service request type (e.g., a request that includes a URL reference).
2. Using the monitoring module 244 to calculate the average number of requests Y in the intervals INT that do not contain the given request.
3. Using the correlation module 248 to calculate the correlation value as $r=(X-Y)/\max(X,Y)$, where $\max(X,Y)$ is the maximum value of either X or Y. This gives the correlation of the occurrence of a specific request type (e.g., containing a specific URL) and any GC interval.

Negative correlation values (e.g., values of r that are proximate to −1) indicate that the request being evaluated (e.g., the given request) operates to reduce the number of requests between GC events 226 significantly, and thus, appears to consume more memory than others. Thus, service requests which result in negative correlation values r may be deemed "suspicious requests". The suspicious requests may be reported to users and/or administrators using the analysis/reporting module 252.

In some embodiments, more detailed analyses of the suspicious requests can be conducted, perhaps off-line, to investigate the actual amounts of memory that are allocated in conjunction with a specific request. The analyses, which may be implemented using the analysis/reporting module 252, may include extracting one or more URLs from a suspicious request, removing the affected node from load balancing service by placing it in maintenance mode, and then switching to the profiler mode for detailed analysis of node performance. At this point, the memory consumption for each class can be aggregated and the source code that is responsible for excess memory consumption can be isolated.

In some embodiments, the correlation is calculated for selected combinations of service requests. For example, correlation can be determined over some selected number of GC intervals INT that have multiple URL requests appearing together: X(URL1, URL2, . . . ) and Y(URL1, URL2, . . . ). The same calculation processes described previously can be applied, with the exception that groups of two or more requests are processed at the same time. The analysis of such combinations can be useful when requests are tightly coupled, or when two or more service requests are associated with URLs that use about the same amount of memory, and the combination results in significantly more memory usage than that which is associated with other requests.

For apparatus 214 that have no GC activity, such that GC events 226 are not generated, a series of time intervals having a substantially constant length can be treated in the same way as GC intervals. Thus, if a system has no garbage collector, the same calculations can be implemented to determine the memory balance during each interval of time. Other embodiments can be realized.

For example, besides the correlation analysis described above, a quantitative analysis can also be made, perhaps in parallel. This can be helpful in estimating the significance of the correlation provided by the correlation analysis.

Consider the following example, where three request types A, B, and C are received: A(size=8 units), B(size=4 units) and C(size=2 units), and where garbage collection begins when the memory size occupied by the current assortment of requests received is 20 units (e.g., GC(size=20)). Assume that over three GC intervals, the following number of requests are received:

| GC | A | B | C |
|----|---|---|---|
| 1  | 1 | 1 | 4 |
| 2  | 0 | 1 | 8 |
| 3  | 1 | 2 | 2 |

The following tupel can be calculated for each row (i.e., each GC interval):

SIZE_MIN=estimate the minimal size for this request

SIZE_AVG=estimate an average value assuming all request have the same size

SIZE_MAX=estimate the size assuming all except the current request have the size of zero During each calculation, two estimates can be made for each request: (a) that each request may consume the same amount of memory, and (b) that each request may consume zero memory. Thus, for each GC interval there are three possible values that can be estimated for each request: (1) The analyzed request might consume aero memory, (2) all requests within the interval have the same memory size consumption, or (3) all requests except the analyzed request have zero memory consumption.

From (1) the first value can be estimated, which is SIZE_MIN=0. From (2) the second value can be estimated, which is SIZE_AVG=1/(number of all requests). From (3) the third value can be estimated, which is SIZE_MAX=1/(number of analyzed requests). This calculation can be accomplished for each GC interval.

After each calculation of a tupel, the value of the prior tupels are combined as follows using a MIN-MAX calculus:

SIZE_MIN=MAX (of all MIN)

SIZE_AVG=MAX (of all AVG) which are smaller than MAX

SIZE_MAX=MIN (of all MAX)

Thus, for this discussion SIZE_MIN=0, and SIZE_AVG of each request is combined as follows: MAX(MAX(SIZE_AVG(actual), SIZE_AVG(combined)), SIZE_MAX(combined)). SIZE_MAX is then calculated as MIN(SIZE_MAX (actual), SIZE_MAX(combined)). In this way, the results of the calculation for the first interval are combined with the results of the calculation resulting from the second interval. The results of the calculation for the third interval are then combined with the results of the combination of the results from the first and second intervals, and so on.

From the example above, the following tupels are determined in a first calculation:

|   | SIZE_MIN | SIZE_AVG | SIZE_MAX |
|---|----------|----------|----------|
| A | 0        | $1/6$    | 1        |
| B | 0        | $1/6$    | 1        |
| C | 0        | $1/6$    | $1/4$    |

In a second calculation, for requests of type C—these values are determined as follows:

MIN=without any more info we can estimate C as zero

AVG=we estimate, that all requests are of the same size

MAX=we estimate, that all requests are zero, except C

|   | SIZE_MIN | SIZE_AVG | SIZE_MAX |
|---|----------|----------|----------|
| A | 0        | 1        | 1        |
| B | 0        | $1/9$    | 1        |
| C | 0        | $1/9$    | $1/8$    |

Then, in a third calculation, the results of the first and second calculations are combined:

|   | SIZE_MIN | SIZE_AVG | SIZE_MAX |
|---|----------|----------|----------|
| A | 0        | $1/6$    | 1        |
| B | 0        | $1/6$    | 1        |
| C | 0        | $1/8$    | $1/8$    |

And then, in a fourth calculation, for requests of type C, the SIZE_AVG is calculated as: SIZE_AVG=MIN(MAX($1/6$, $1/9$), $1/8$)=$1/8$. The value of SIZE_AVG should increase, because the value of the smallest request is estimated too high and all others estimated too low. If the assumption is made that all requests consume the same amount of memory, then requests using less memory have been estimated as too high, and requests using more memory have been estimated too low. The calculus grants that the requests using less memory will be reduced by SIZE_MAX over time, while the requests using more memory will be enlarged by SIZE_AVG using the MAX calculus. In this way, the prior assumption will improve over time.

|   | SIZE_MIN | SIZE_AVG | SIZE_MAX |
|---|----------|----------|----------|
| A | 0        | $1/5$    | 1        |
| B | 0        | $1/5$    | $1/2$    |
| C | 0        | $1/5$    | $1/2$    |

In a fifth calculation, the results of the fourth calculation are combined with the results of the third calculation:

|   | SIZE_MIN | SIZE_AVG | SIZE_MAX |
|---|----------|----------|----------|
| A | 0        | $1/5$    | 1        |
| B | 0        | $1/5$    | $1/2$    |
| C | 0        | $1/8$    | $1/8$    |

As a result, the size of each request can be estimated (with more GC intervals the estimation becomes more accurate):

|   | Estimated (SIZE_MIN + SIZE_MAX)/2 | Size |
|---|---|---|
| A | 0.6 | 0.4 |
| B | 0.35 | 0.2 |
| C | 0.125 | 0.1 |

Knowing the quantitative analysis value results, a decision can be made as to whether it is useful to eliminate a constant value of correlation, and establish a weighted correlation. The weighted correlation can be used to take into account that memory consumption within a GC interval after eliminating the smallest URL request is known. Any other occurrence of a URL request operates over a defined GC memory interval, which can be added into the correlation function as factor. For example, assuming requests of type C occupy $\frac{1}{10}$ of the GC memory, eliminating requests of type C from the calculations would mean that the occurrence of requests of types A and B occupy on (1−2*0.1=0.8) of the original memory space. Still other embodiments may be realized.

Figure 3:
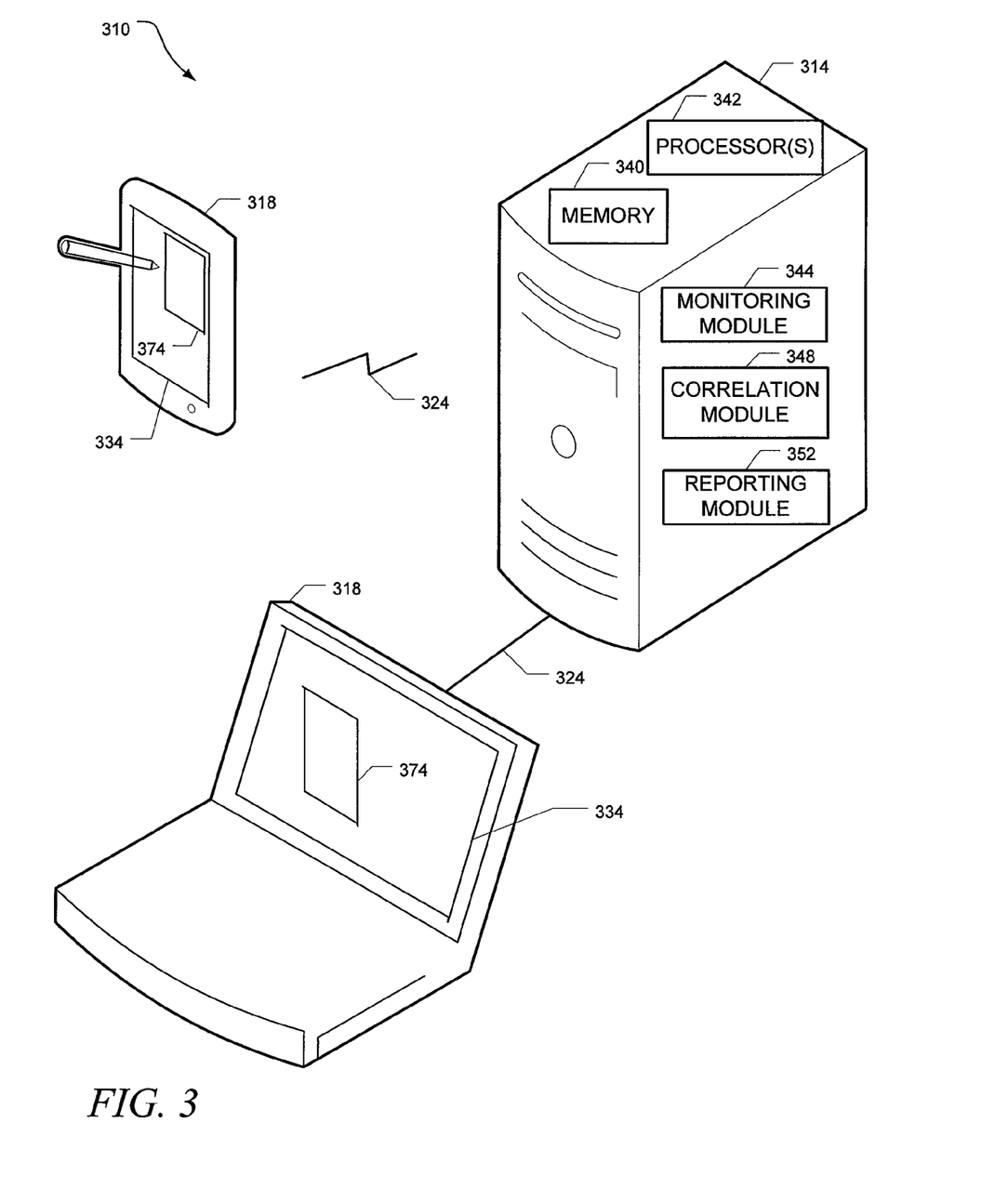
FIG. 3 is a block diagram of a system for monitoring memory consumption, according to various embodiments of the invention.

For example, FIG. 3 is a block diagram of a system 310 for monitoring memory consumption, according to various embodiments of the invention. Some embodiments of an apparatus 314 (e.g., a node operating as a server) operating within the system 310 comprise a monitoring module 344 to detect occurrence of memory GC events and node content service requests, and a processor-implemented correlation module 348 to determine the correlation between the node content service requests and the memory GC events. The apparatus 314 may also include a reporting module 352 to report information associated with suspicious ones of the node content service requests that satisfy a preselected criteria associated with the correlation (e.g., correlation r<0, or r<−0.5). The monitoring module 344 and reporting module 352 may be integrated into a single module, or exist as two separate modules (shown).

In some embodiments, the apparatus 314 comprises a memory 340 to record timing information associated with the memory GC events. Thus, starting times, ending times, or both, associated with various memory GC events can be stored in the memory 340.

The apparatus 314 may also comprise a display 334, either integrated into the apparatus 314, or remotely coupled to it (shown, using a wired or wireless network 324). Devices 318 (e.g., nodes) that are coupled to the apparatus 314 may be used to house the display 334. Thus, the display 334 and modules 344, 348, 352 may be included in separate devices (shown), such as a client and server. The display 334 and modules 344, 348, 352 may also be integrated into a single device, such as a server or client, or an independent device, such as a laptop computer, PDA, or cellular telephone.

The display 334 can be used to display an alert message 374 in conjunction with information associated with suspicious node content service requests. In this way, high correlation values (e.g., r<−0.5) can be used to set off a visual alarm, to alert system administrators to excessive memory use within the system 310.

Still further embodiments may be realized. Some of these include a variety of methods.

Figure 4:
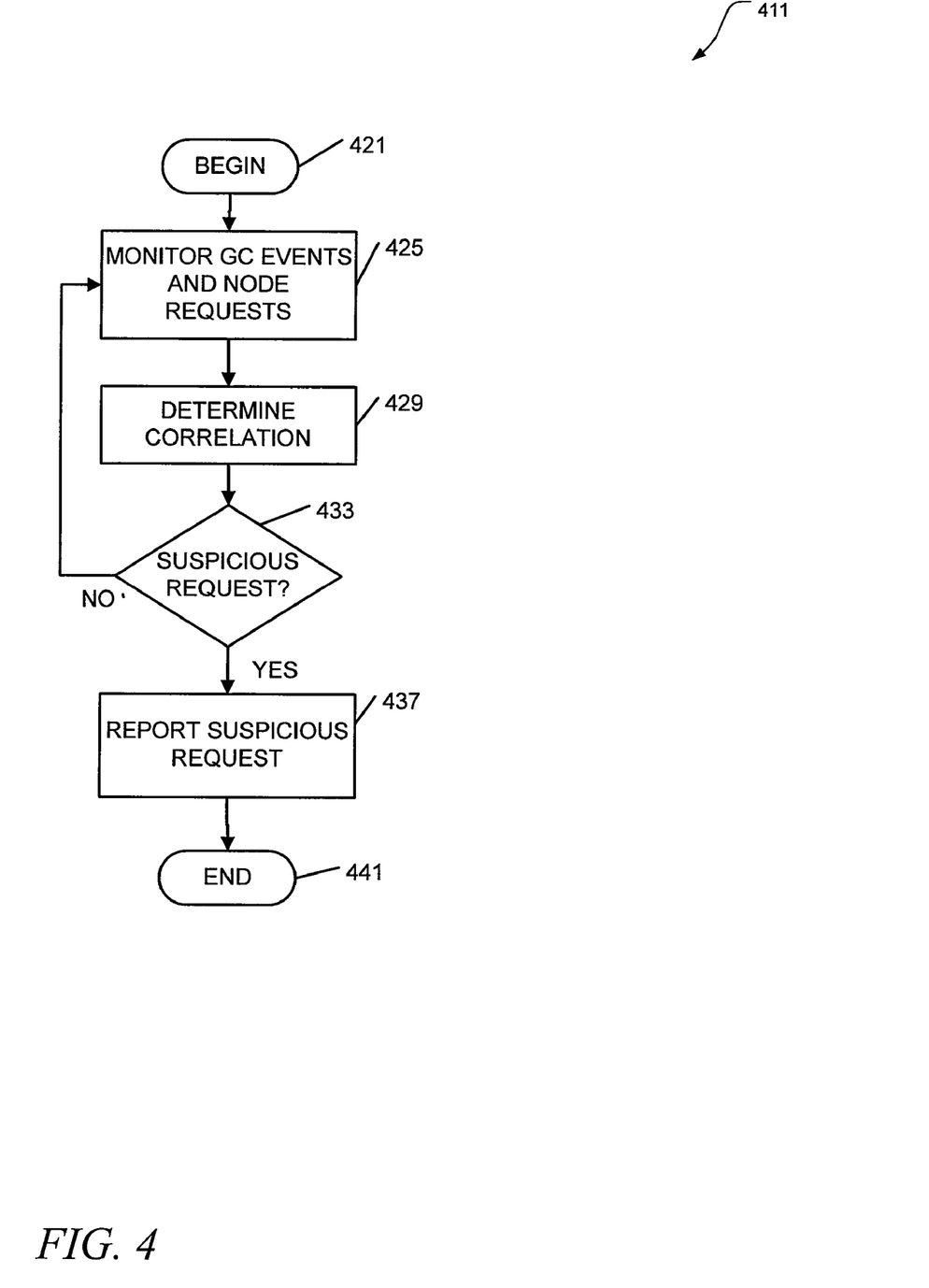
FIG. 4 is a flow diagram illustrating methods of monitoring memory consumption according to various embodiments of the invention.

For example, FIG. 4 is a flow diagram illustrating methods 411 of monitoring memory consumption according to various embodiments of the invention. The methods 411 are implemented in a machine-accessible and readable medium, and are operational over processes within and among networks. The networks may be wired, wireless, or a combination of wired and wireless. The methods 411 may be implemented as instructions, which when accessed by a machine, perform the processing depicted and described with respect to the elements and processes shown in FIGS. 1-3. Given this context, monitoring memory consumption is now discussed with reference to FIG. 4.

In some embodiments, a computer-implemented method 411 of monitoring memory consumption may begin at block 421, and continue on to block 425 with monitoring the occurrence of memory GC events and node content service requests. To determine correlation, it can be useful to record the timing of GC events, so that the number of node content service requests during any particular time interval defined by GC event start times, GC event end times, or both, may be calculated. Thus, the monitoring activity at block 425 may comprise recording at least one of the starting time or the ending time of memory GC events.

Similarly, it is possible to record the timing of node content service requests as they relate to the occurrence of memory GC events. Thus, the timing of node content service requests can be recorded, and the number of garbage collection events that occur over intervals defined by the node content service request timing can be noted. Therefore, the monitoring activity at block 425 may comprise recording at least one of a starting time or an ending time of the node content service requests.

Such an approach may be useful for environments where processor activity correlates with memory consumption. However, in each case, elapsed time should be distinguished from processor use time (e.g., an idle thread does not consume memory).

The existence and/or timing of the node content service requests can be recorded in a queue that makes the associated information available for periodic extraction when correlation analysis is desired. Thus, the monitoring activity at block 425 may comprise recording the node content service requests in a queue.

URL information, as a particular kind of information included in a node content service request, can also be recorded. Thus, the monitoring activity at block 425 may comprise recording URL information as a portion of the node content service requests.

The method 411 may continue on to block 429 with determining a correlation between the node content service requests and the memory GC events. As noted previously, correlation may be determined between the number of node content service requests over time intervals defined by the memory GC events.

In some embodiments, such as when a URL forms part of the service request, correlation is determined by using an average number of node content service requests that include a selected URL, and an average number of node content service requests that exclude the selected URL. Thus, the activity at block 429 may comprise determining the correlation between an inclusive average number of the node content service requests including a selected URL and an exclusive average number of the node content service requests not including the selected URL, over time intervals defined by the memory GC events.

In some embodiments, the averages may be combined in a particular manner to determine the correlation, as discussed previously. Thus, the activity at block 429 may comprise calculating the correlation as a difference between the inclusive average and the exclusive average, divided by a maximum value of the inclusive average or the exclusive average.

In some embodiments, the GC collection intervals can be defined as the interval between the start time of a first GC event, until the start time of a second GC event, or the ending time of the first GC event, until the ending time of the second GC event. Thus, the time intervals used to determine correlation at block 429 may be defined by one of a start time of GC events and an end time of GC events.

To determine whether two or more tightly-coupled service requests may be causing excessive memory use, the activity at block 429 may comprise determining the correlation between some number of the node content service requests over time intervals defined by the memory GC events, wherein the number of node content service requests is based on multiple common URL values, for example.

The method 411 may continue on to block 433 with detecting that the correlation has exceeded a threshold associated with preselected criteria, indicating that the correlation between the node content service requests and the memory GC events is sufficient to trigger additional analysis of suspicious ones of the node content service requests. For example, when the correlation crosses a predetermined threshold (e.g., $r<-0.5$), additional analysis of the suspicious node content service requests can be initiated.

Thus, if no suspicious requests are found at block 433, then the method 411 may return to block 425, to continue monitoring GC events and incoming node content service requests. Otherwise, if a request is identified as being a suspicious request due to the satisfaction of preselected criteria associated with the correlation determination, the method 411 may continue on to block 437 with reporting information (e.g., one or more URLs) associated with the suspicious node content service requests. The activity of reporting at block 437 may further include displaying at least one of the correlation or the information associated with suspicious ones of the node content service requests as part of a GUI.

In this way, by monitoring GC events and incoming requests, suspicious memory consumption activity related to certain server content service requests can be recognized and reported, with a relatively low impact on system performance. Further embodiments may be realized.

Figure 5:
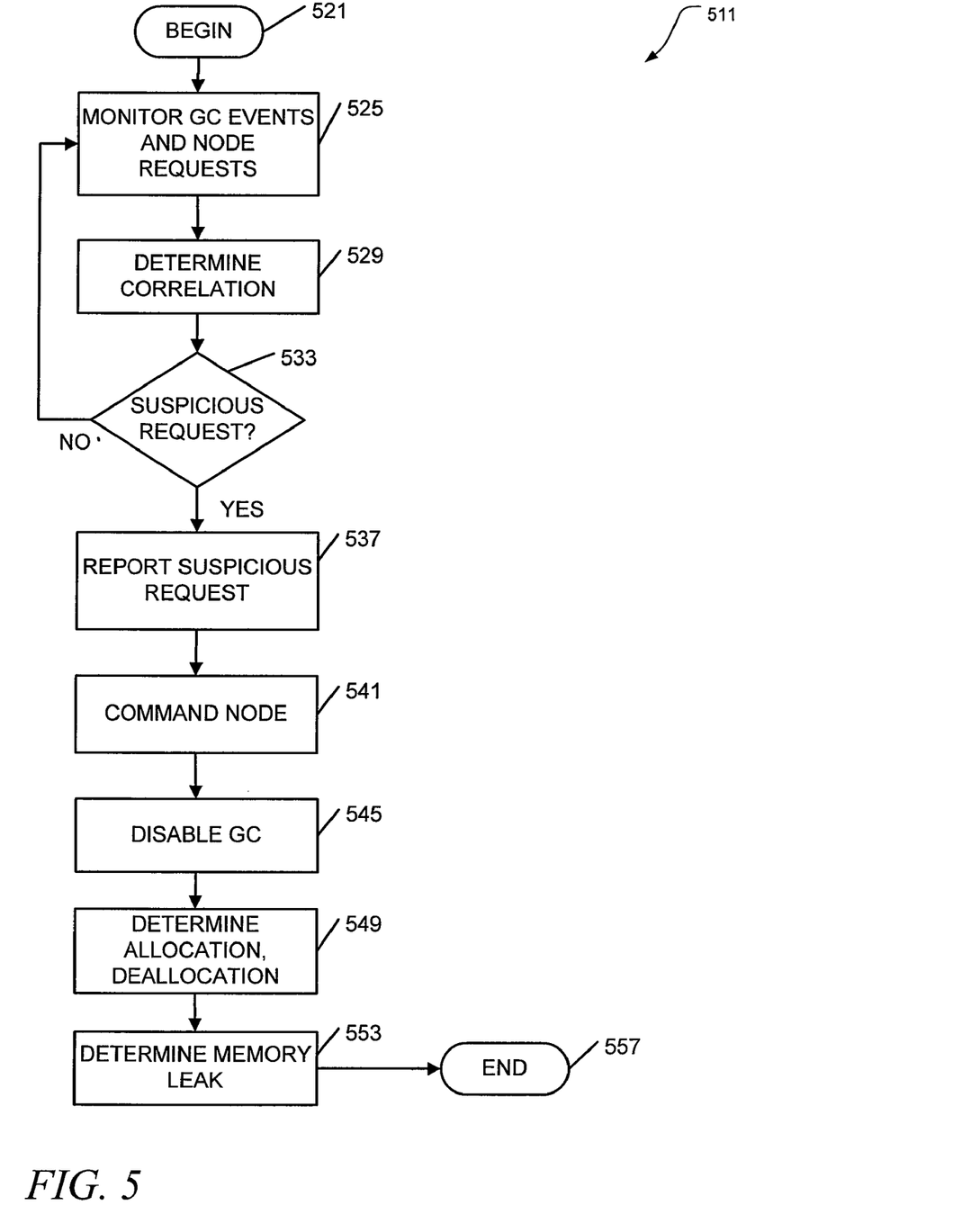
FIG. 5 is a flow diagram illustrating additional methods of monitoring memory consumption according to various embodiments of the invention.

For example, FIG. 5 is a flow diagram illustrating additional methods 511 of monitoring memory consumption according to various embodiments of the invention. The methods 511 are implemented in a machine-accessible and readable medium, and are operational over processes within and among networks. The networks may be wired, wireless, or a combination of wired and wireless. The methods 511 may be implemented as instructions, which when accessed by a machine, perform the processing depicted and described with respect to the elements and activities of FIGS. 1-4. Given this context, monitoring memory consumption is now discussed with reference to FIG. 5.

In some embodiments, a computer-implemented method 511 of monitoring memory consumption may begin at block 521 and continue on to block 525 with monitoring a timing relationship between memory GC events and node content service requests that include URL information.

The method 511 may continue on to block 529 with determining the correlation between the node content service requests and the memory GC events. For example, correlation can be determined using an average of node content service requests over time intervals defined by GC events. Thus, the activity at block 529 may include determining the correlation between an inclusive average number of the node content service requests over a selected number of intervals defined by the memory GC events, and an exclusive average number of the node content service requests over the selected number of intervals defined by the memory GC events.

As noted previously, URLs from a combination of requests can be used in the correlation analysis to determine whether selected URLs operate together to consume large amounts of memory. Thus, the activity of block 529 may comprise combining the URL information associated with multiple node content service requests to determine the correlation between individual ones of the multiple node content service requests.

The method 511 may continue on to block 533 to determine whether any suspicious requests have been identified. If no such requests have been found, then the method 511 may return to block 525 to continue monitoring GC events and node access requests. Otherwise, if requests are identified that satisfy a preselected criteria associated with the correlation, so as to be characterized as suspicious requests, then the method 511 may continue on to block 537 with reporting information associated with the suspicious node content service requests. Thus, in some embodiments, the methods 511 may operate to monitor GC timing relationships that specifically involve the use of URLs, rather than the occurrence of requests that may or may not involve URLs.

The information associated with suspicious requests can be displayed using an Internet browser or a banner on a display surface, such as a flat panel display. Thus, the reporting activity at block 537 may include displaying a web page window or a sidebar window, or both, as part of a GUI (e.g., see the alert message 374 of FIG. 3).

The method 511 may continue on to block 541 with commanding a network node to enter the maintenance mode so that node content service requests are no longer processed by the node. In this way, the node receiving suspicious requests can be taken off of the network for further analysis using the maintenance mode. As part of the activity at block 541, the method 511 may include commanding the node to enter profiler mode.

At selected times, GC events can be stopped to allow for more detailed analysis of behavior in response to the node content service requests. For example, in JVM embodiments, the Java method "System.gc" can be disabled (although GC can still be triggered using the Java Virtual Machine (JVM) Tool Interface (TI) Jvmti->ForceGarbageCollection). Thus, the method 511 may include selectively disabling memory GC events at block 545.

In some embodiments, the memory used as a result of a suspicious request can be determined in profiler mode, and the memory restored by GC events can also be determined in this mode. Thus, the method 511 may go on to block 549 to include determining a first amount of memory allocated within the node to one or more of the suspicious node content service requests, and determining a second amount of memory deallocated by memory GC events.

If the memory allocated is consistently greater than the memory restored, then there may be a memory leak, or consistent loss of memory over time, due to the suspicious node content service request that is under investigation. Thus, the method 511 may include comparing the first amount of memory and the second amount of memory to determine if a memory leak exists at block 553. The method 511 may then terminate at block 557.

Those of ordinary skill in the art will realize that each of the method elements shown in FIG. 5 may be added to or substituted for any of the method elements shown in FIG. 4. Additionally, those of ordinary skill in the art will also realize that each of the method elements of FIGS. 4-5 may be combined in a variety of ways, to form a variety of methods that use the elements from each of the figures in serial, parallel, looped, and/or repetitious fashion.

Figure 6:
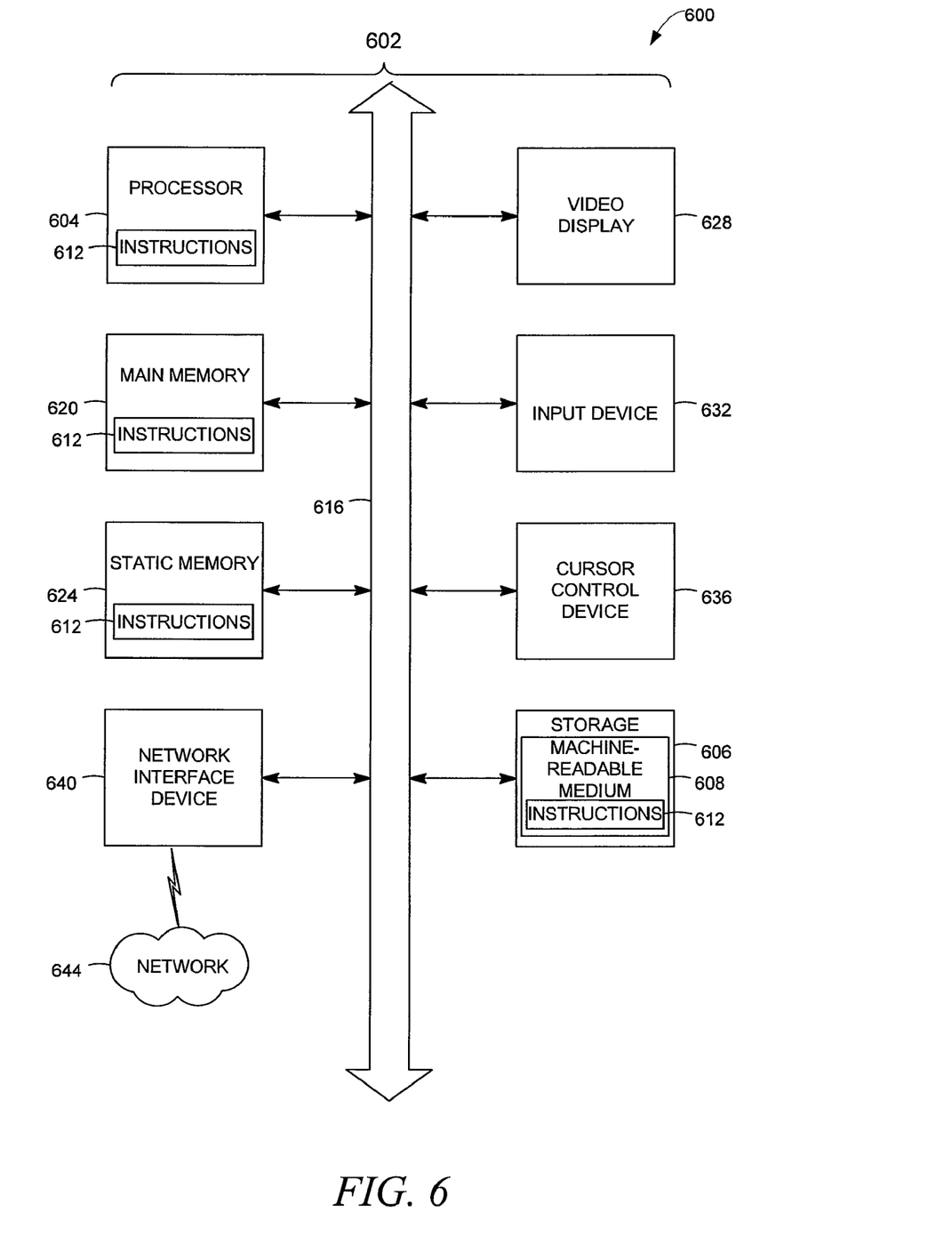
FIG. 6 is a block diagram of a machine in the example form of a computer system according to various embodiments of the invention.

FIG. 6 is a block diagram of a machine 602 in the example form of a computer system 600 according to various embodiments of the invention. The computer system 600 may include a set of instructions 612 for causing the system 600 to perform any one or more of the activities discussed herein, including those illustrated in FIGS. 4-5. The system 600 may be similar to or identical to the system 310 of FIG. 3, or any of its elements, such as the apparatus 314 or the devices 318.

In FIG. 6, it can be seen that the components of the machine 602 may include main memory 620, static or non-volatile memory 624, and mass storage 606. Other components coupled to the processor 604 may include an output device 628, such as a video display, an input device 632, such as a keyboard, and a cursor control device 636, such as a mouse. A network interface device 640 to couple the processor 604 and other components to a network 644 may also be coupled to the bus 616.

The processor 604, the memories 620, 624, and the storage device 606 may each include instructions 612 which, when executed, cause the machine 602 to perform any one or more of the methods described herein. The instructions 612 may further be transmitted or received over the network 644 via the network interface device 640 utilizing any one of a number of well-known transfer protocols (e.g., the HyperText Transfer Protocol). Any of these elements coupled to the bus 616 may be absent, present singly, or present in plural numbers, depending on the specific embodiment to be realized.

In some embodiments, the machine 602 operates as a standalone device or may be connected (e.g., networked) to other machines. In a networked environment, the machine 602 may operate in the capacity of a node, such as a server or a client device in server-client network environment, or as a peer machine in a peer-to-peer (or distributed) network environment. The machine 602 may comprise a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 602 is illustrated, the term "machine" shall also be taken to include any collection of machines that individually or jointly execute a set (or multiple sets) of instructions to perform any one or more of the methodologies discussed herein.

While the machine-readable medium 608 is shown as a single medium, the term "machine-readable medium" should be taken to include a single medium or multiple media (e.g., a centralized or distributed database, and/or associated caches and servers, and or a variety of storage media, such as the processor 604 registers, memories 620, 624, and the storage device 606) that store the one or more sets of instructions 612. The term "machine-readable medium" shall also be taken to include any medium that is capable of storing, encoding or carrying a set of instructions for execution by the machine and that cause the machine 602 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

In conclusion, it can be seen that when memory consumption is monitored using correlation analysis, as described herein, there may be relatively little impact on the system performance. Thus, overall system performance can be increased over those solutions that interact more directly with memory operations, so that in many instances, analysis results are available quickly—perhaps in time to remedy memory consumption situations that might otherwise lead to a system operational collapse.

Embodiments of the invention can be implemented in a variety of architectural platforms, operating and server systems, devices, systems, or applications. Any particular architectural layout or implementation presented herein is thus provided for purposes of illustration and comprehension only, and is not intended to limit the various embodiments.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer-implemented method for monitoring memory consumption on an application server, comprising:
    monitoring occurrence of memory garbage collection events on the server;
    monitoring node content service requests to the server node that include uniform resource locator information and requests that do not include uniform resource locator information;
    determining a correlation between the node content service requests and the memory garbage collection events,
    wherein determining the correlation comprises determining the correlation between an inclusive number of the node content service requests that include uniform resource locator information and an exclusive number of the node content service requests that do not include uniform resource locator information, over time intervals defined by the memory garbage collection events; and
    reporting information associated with ones of the node content service requests which satisfy a criteria associated with the correlation and which indicate an amount of memory use by said node content service requests.

2. The method of claim 1, wherein the monitoring comprises:
    recording at least one of a starting time or an ending time of the memory garbage collection events.

3. The method of claim 1, wherein the monitoring comprises:
    recording at least one of a starting time or an ending time of the node content service requests.

4. The method of claim 1, wherein the monitoring comprises:
    recording the node content service requests in a queue.

5. The method of claim 1, wherein the monitoring comprises:
    recording uniform resource locator information as a portion of the node content service requests.

6. The method of claim 1, wherein the determining comprises:
   determining the correlation between a number of the node content service requests over time intervals defined by the memory garbage collection events.
7. The method of claim 1, wherein the determining comprises:
   determining the correlation between an inclusive average number of the node content service requests including a selected uniform resource locator and an exclusive average number of the node content service requests not including the selected uniform resource locator, over time intervals defined by the memory garbage collection events.
8. The method of claim 7, further comprising:
   calculating the correlation as a difference between the inclusive average and the exclusive average, divided by a maximum value of the inclusive average and the exclusive average.
9. The method of claim 7, wherein the time intervals are defined by one of a start time of garbage collection events and an end time of garbage collection events.
10. The method of claim 1, wherein the determining comprises:
   determining the correlation between a number of the node content service requests over time intervals defined by the memory garbage collection events, wherein the number of node content service requests is based on multiple common universal resource locator values.
11. The method of claim 1, further comprising:
   Executing a quantitative analysis of the service requests to provide at least one weighting factor for the correlation.
12. A computer-implemented method, comprising:
   monitoring a timing relationship between memory garbage collection events and node content service requests that include uniform resource locator information;
   determining a correlation between the node content service requests and the memory garbage collection events based on the timing relationship,
   wherein the determining comprises determining the correlation between an inclusive number of the node content service requests over a selected number of intervals defined by the memory garbage collection events and an exclusive number of the node content service requests over the selected number of intervals defined by the memory garbage collection events; and
   reporting information associated with ones of the node content service requests which satisfy a criteria associated with the correlation and which indicate an amount of memory use by said node content service requests.
13. The method of claim 12, wherein the reporting comprises:
   at least one of displaying a web page window or a sidebar window as part of a graphical user interface.
14. The method of claim 12, further comprising:
   commanding a node in a network to enter maintenance mode so that the node content service requests are no longer processed by the node.
15. The method of claim 14, further comprising:
   commanding the node to enter profiler mode; and
   determining a first amount of memory allocated within the node to at least one of the suspicious ones of the node content service requests.
16. The method of claim 15, further comprising:
   determining a second amount of memory deallocated by one of the memory garbage collection events.
17. The method of claim 16, further comprising:
   comparing the first amount of memory and the second amount of memory to determine if a memory leak exists.
18. The method of claim 12, further comprising:
   selectively disabling the memory garbage collection events.
19. The method of claim 12, further comprising:
   combining the uniform resource locator information associated with multiple node content service requests to determine the correlation between individual ones of the multiple node content service requests.
20. A computer readable storage medium having instructions stored therein for causing a computer to implement a method, the method comprising: monitoring occurrence of memory garbage collection events on a server;
   monitoring node content service requests to the server node that include uniform resource locator information and requests that do not include uniform resource locator information;
   determining a correlation between the node content service requests and the memory garbage collection events; and
   wherein determining the correlation comprises determining the correlation between an inclusive number of the node content service requests that include uniform resource locator information and an exclusive number of the node content service requests that do not include uniform resource locator information, over time intervals defined by the memory garbage collection events; and
   reporting information associated with ones of the node content service requests which satisfy a criteria associated with the correlation and which indicate an amount of memory use by said node content service requests.
21. The computer readable storage medium of claim 20, wherein the method comprises:
   detecting that the correlation has exceeded a threshold associated with the preselected criteria, indicating that the correlation between the node content service requests and the memory garbage collection events is sufficient to trigger additional analysis of the suspicious ones of the node content service requests.
22. The computer readable storage medium of claim 20, wherein the reporting comprises:
   displaying at least one of the correlation or the information associated with the suspicious ones of the node content service requests as part of a graphical user interface.
23. An apparatus, comprising:
   a monitoring module to detect occurrence of memory garbage collection events and node content service requests that include uniform resource locator information and requests that do not include uniform resource locator information;
   a memory to record timing information associated with the memory garbage collection events;
   a processor-implemented correlation module to determine a correlation between the node content service requests and the memory garbage collection events using the timing information;
   wherein the determining comprises determining the correlation between an inclusive number of the node content service requests over a selected number of intervals defined by the memory garbage collection events and an exclusive number of the node content service requests over the selected number of intervals defined by the memory garbage collection events; and a reporting module to report information associated with ones of the node content service requests which satisfy a criteria associated with the correlation and which indicate an amount of memory use by said node content service requests.

24. The apparatus of claim 23, further comprising:

a display to display an alert message in conjunction with the information associated with suspicious ones of the node content service requests.

* * * * *